United States Patent [19]

Bourauel et al.

[11] Patent Number: 4,524,612

[45] Date of Patent: Jun. 25, 1985

[54] TESTING INSTALLATION FOR MOTOR VEHICLE OPERATING ELEMENTS

[75] Inventors: Fritz Bourauel; Wolfgang P. Flohr; Walter Weishaupt, all of Munich, Fed. Rep. of Germany

[73] Assignee: Bayerische Motoren Werke Aktiengesellschaft, Fed. Rep. of Germany

[21] Appl. No.: 563,458

[22] Filed: Dec. 20, 1983

[30] Foreign Application Priority Data

Dec. 23, 1982 [DE] Fed. Rep. of Germany ....... 3247858

[51] Int. Cl.³ ........................................... G01M 15/00

[52] U.S. Cl. ............................... 73/117.3; 340/52 D; 340/52 F

[58] Field of Search ..................... 73/117.3; 340/52 R, 340/52 D, 52 F; 364/569

[56] References Cited

U.S. PATENT DOCUMENTS

| | | | |
|---|---|---|---|
| 3,972,022 | 7/1976 | Gato et al. | 340/52 D |
| 4,159,531 | 6/1979 | McGrath | 340/52 D X |

*Primary Examiner*—Jerry W. Myracle
*Attorney, Agent, or Firm*—Craig & Burns

[57] ABSTRACT

A test installation for motor vehicle operating elements which change compared to a starting condition and which trigger an indicating device when reaching a limit value; a number of change intervals related to a change-influencing parameter and equal among each other are coordinated to the changes of the operating elements and one indicating device each is coordinated to the intervals of equal value of the operating elements; of the several operating elements, that operating element triggers the indicating device and also a warning indicating device which as the first one reaches the limit of its associated change interval, respectively, its limit for the predetermined overall change.

30 Claims, 2 Drawing Figures

TESTING INSTALLATION FOR MOTOR VEHICLE OPERATING ELEMENTS

Figure 1:
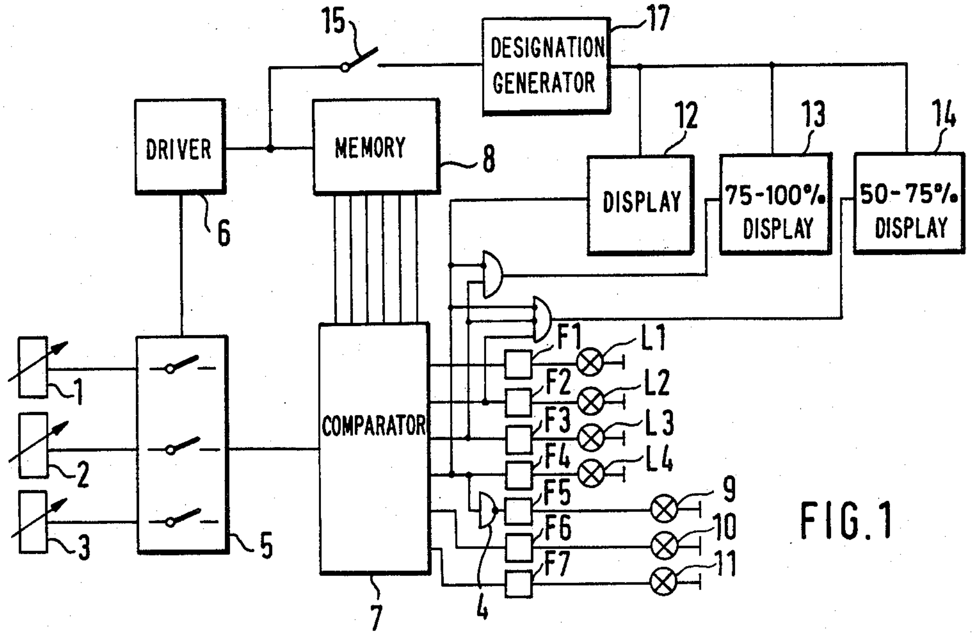

The present invention relates to a test system for motor vehicle-operating elements which change compared to a starting condition and which, upon reaching an individual limit condition, trigger a common indicating installation.

The probably best known test installation of this type is the so-called brake lining wear indication, in which as a rule a limit condition in the form of a brake lining wear up to a minimum lining thickness is indicated by engagement of a single warning lamp. However, also several brake linings can be monitored thereby with the aid of the same warning lamp and the wear indication can be triggered by the first lining which reaches its limit condition. As a rule, all of the brake linings of the motor vehicle are then replaced.

The present invention is concerned with the task to provide a test installation of the aforementioned type, by means of which the change behavior, respectively, the condition of operating elements, especially of different operating elements can be monitored or tested in an easily understandable manner prior to reaching the respective limit condition.

The underlying problems are solved according to the present invention in that from the changes of the operating elements, an equal number of change intervals is formed which follow one another and extend up to the respective limit condition, in that one further indicating device each is coordinated to the change intervals of equal value of the operating elements, and in that the operating element which as the first operating device reaches the limit of its change interval triggers the respective indicating device.

It is possible thereby with the aid of few indicating devices to monitor or test the change-behavior of a large number of operating elements. As with the brake lining wear indication, the changes of the operating element may thereby involve the wear of the operating elements. In addition to a brake lining, also a clutch lining can be tested and monitored. In lieu of the wear, also the quality of a lubricating or operating medium of the vehicle or of the internal combustion engine thereof may be taken into consideration. Furthermore, changes of the operating ability and/or of the efficiency of structural parts can be taken into consideration, such as, for example, of an air filter as a result of increased accumulation of harmful materials. The testing installation itself can be used within the framework of a service interval indicating installation for signalling to the vehicle user servicing operations to be carried out or in repair shops for the control of the condition of the operating elements.

The operating element which changes most pronouncedly up to reaching the limit of the change interval, thereby controls the respective indicating device. It may thereby happen that the indicating devices are triggered by different operating elements of the test scope corresponding to the change behavior of the operating elements since each indicating device can be triggered by each of the operating elements.

A service interval indicating system for motor vehicles is disclosed in the German Offenlegungsschrift No. 31 04 197 in which a desired or rated travel distance is subdivided into several desired or rated intervals of equal magnitude and its own signalling element is coordinated to each of these intervals which changes its switching condition at the end of the interval. The present invention differs therefrom in that the operating elements themselves control the indicating devices. Though a reference to the change-behavior of operating elements is provided in this prior art indicating installation in that the driven distance can be weighted prior to its registration corresponding to the load of the vehicle engine. However, this involves an indirect and merely overall consideration of the change behavior of the individual operating elements.

In the present invention, an equal number of, for example, four indicating devices are coordinated to the different operating elements. The extent of change of the operating elements which is taken into consideration, is subdivided into a number of change intervals equal to the number of the indicating devices. The extent of the change may be the entire change from the starting condition to the limit condition or only a portion changing with the limit condition. As a result thereof, non-critical starting changes may remain without consideration for the "length of life" of the operating element. The change intervals of each operating element may be of different magnitude or they may be all equal among each other.

A particularly noticeable indication can be obtained additionally if the changes are related to a change-influencing parameter. These parameters may be selected equally for the operating elements. Such a parameter may be the driven distance or the number of the operating hours. In the alternative, the parameters may also be different, for example, the influencing-magnitudes determinative for the change. This may thereby again involve the driven distance, as applicable with good approximation in the case of the known brake lining wear indication. Further possibilities are the load or utilization extent of the operating element.

Measuring magnitudes therefor may be the consumed overall fuel quantity as indicated in the German Offenlegungsschrift No. 31 04 174, the driven distance weighted corresponding to the engine load in accordance with the German Offenlegungsschrift No. 31 04 196, again the total number of operating hours, etc. or combinations of these influencing magnitudes. Nonlinear relationships between change and the change-influencing parameter may be taken into consideration correspondingly by appropriately relating the same so that also with such nonlinearities a reliable indication concerning the probable "durability" or length of life of the operating elements can be obtained at any time. If additionally the change-influencing parameters of the operating elements are selected identical, then the further change behavior may be predicted with good reliability from the pre-existing progress of the change behavior.

Independently of the special use and construction of the test installation, a particularly effective indication is obtained by the use of lights as indicating devices. These lights can be so connected in a circuit that they are turned off when triggered. Within the scope of a service-interval-indicating installation, the indicating devices which have not yet been turned off, can be engaged or turned-on during the starting of the motor vehicle and immediately thereafter disengaged or turned-off, for example, with the aid of a conventional, series-produced oil pressure control switch.

In this application, it is also possible with the triggering of the indicating device coordinated to the last change-interval of the operating element to engage or turn-on a warning indicating device analogous to the known brake lining wear, respectively of a minimum level indication.

With a further change of the operating elements, after the triggering of the warning indicating device, further warning indicating devices may be engaged or turned on by the operating elements whose changes exceed as first ones, intervals lying above the boundary limit value. The necessity of an examination of the motor vehicle is rendered particularly noticeable thereby.

This examination may be undertaken, for example, in such a manner that the determinative, respectively reached change interval of the individual structural parts is readable individually. A tabulation of the change behavior of the operating elements measured in steps results therefrom. A further assist results from the fact that also or exclusively the designation of the operating elements located within the respective change intervals can be read out by means of such a test.

A further facilitation is obtained if only the operating elements can be read as regards their designation and/or as regards their determinative change interval whose change has reached a predetermined extent. The extent may thereby be half the entire change. If one starts from the fact that, following the testing, at least the operating element is returned to the starting condition, which has reached its limit condition, then it can be assumed with some certainty that the operating elements which cannot be read-out, will last up to the renewed reaching of the limit condition of this operation element.

In order to be able to estimate which of the operating elements are to be actually examined, respectively, replaced with a triggered warning indication, the predetermined extent for the change may also be three-quarters of the entire change. All operating elements whose change has exceeded this extent, are appropriately exchanged at the same time, respectively, returned into their original starting condition.

In addition to the selection of the operating elements to be possibly replaced with the aid of their designation, the required service may also be determined by an additional measure. If the operating elements or at least groups thereof are so constructed, for example, by suitable material selection that they have a matched change behavior which is synchronous, so to speak of—the change intervals for these operating elements are traversed synchronously on the average—then conclusions can be drawn from the change behavior of one of these operating elements to the change behavior of the other operating elements (of this group). The operating elements reach nearly at the same time the limit condition, respectively, change marks located ahead thereof which are appropriately identical with the limits of the change interval.

In order to be able to recognize in particular in this case an abnormal change behavior of an operating element, the changes of the operating element may be compared with predetermined change curves prior to their coordination with the indicating devices. In case of a defect of the operating element or of the sensor device determining the condition, respectively, the change of the operating element, an error indication can then be triggered without addressing the operating element. The remaining operating elements are continued to be examined with the aid of the indicating devices.

Figure 2:
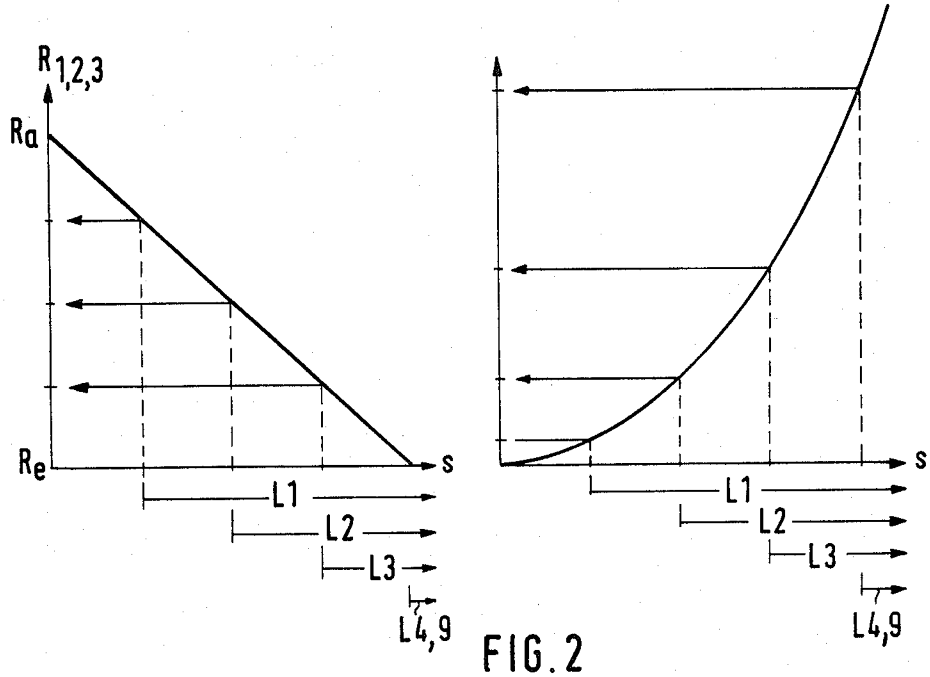

These and other objects, features and advantages of the present invention will become more apparent from the following description when taken in connection with the accompanying drawing which shows, for purposes of illustration only, one embodiment in accordance with the present invention, and wherein:

FIG. 1 is a block diagram of the circuit arrangement for a test installation of motor vehicle operating elements in accordance with the present invention; and FIG. 2 are diagrams for explaining the operation of the test installation of the present invention.

Referring now to the test installation of FIG. 1, the latter serves the purpose of testing and monitoring the change-behavior of operating elements of a motor vehicle. The operating elements may all be physical parts or operating media which, by reason of their length of life and/or loads, experience a change in their properties. Among those are, for example, the so-called wearing-out parts such as brake and clutch lining, operating fluids such as brake and cooling fluid or engine and tramsission oil, additionally also closed-off or sealed-off systems and the parts thereof such as, for example, an air-conditioning system and its essential component parts, whose properties, respectively, outputs can change for the most part only in exceptional cases.

These operating elements are tested either together or in the form of a selected group with the aid of only few light diodes, in the illustrated embodiment with the aid of four light diodes L1–L4. For that purpose, individual sensors or pick-ups are coordinated to the operating elements which reproduce continuously or quasi-continuously the properties of the operating elements in a number of steps corresponding to the number of light diodes. In FIG. 1, the transmitters or pick-ups (transducers) are indicated schematically as resistances 1 to 3 for three such operating elements, not described in detail though, of course, any number of operating elements can be tested by the use of a corresponding number of transmitters or pick-ups. The resistances 1 to 3 change continuously their resistance value corresponding to the change of the operating elements from a predetermined starting value to a predetermined end value. If the operating element is, for example, a brake lining, then the resistance may be a resistance element which is integrated into the brake lining wear and is reduced corresponding to the brake lining wear and thereby also reduces its resistance value. If the operating element is, for example, an air filter whose property is determined in a conventional manner with the aid of the pressure difference, then the resistance may be, for example, a piezo-element which is acted upon by the pressure difference.

A measurement position switch 5 which is connected with its inputs to the outputs of the resistances 1 to 3, is controlled by a driver 6 and is connected with its output to a comparator 7. The driver 6 additionally controls a storage or memory device 8 which is also connected with the comparator 7. In addition to the light diodes L1–L4 which are connected to outputs of the comparator 7 by way of flip-flops F1–F4, further light diodes 9–11 are connected to the outputs of the comparator 7, of which the lights diodes L1–L4 have a uniform color, for example, a green color while the light diodes 9–11 are each of a different color. The light diode 9 is connected with the output of the comparator 7 for the light diode L4 by way of an inverter 4 and a flip-flop F5.

Additionally, alpha-numerical reproduction or display devices 12 to 14 are connected to the outputs of the comparator 7 for the light diodes L2–L4. The driver 6 additionally controls by way of a selectively actuatable switch 15, a designation generator 17 whose output is again connected to the alpha-numerical reproduction or display devices 12 to 14.

The storage or memory device 8 contains resistance values belonging to each of the resistances 1 to 3, which corresponds to the number of light diodes L1 to L4, i.e., in the illustrated embodiment to four. These resistance values are so selected corresponding to the change-behavior of the operating elements that they correspond to identical intervals of the parameter under consideration influencing the change of the operating element. If this parameter is, for example, the driven distance and if the relationship between the change of the associated resistance and the driven distance is linear, as indicated in the left part of FIG. 2, then the interval-determining resistance values contained in the storage device 8 are also proportional to one another. If the resistance value decreases linearly from a starting value $R_a$ to an end value $R_e$ when driving a distance of 30,000 kilometers, then the light diodes L1 to L4 are caused to be extinguished successively if the resistance value changes by respective 25% of the differences $R_a$- $R_e$. This takes place by reason of the linear relationship, in each case after driving one-quarter of the entire travel distance, in this case, 30,000 kilometers.

It is possible in this manner to determine the condition of the operating elements independently of the travel distance actually driven in the individual case by comparison with the stored resistance values and to undertake possibly an exchange or other reestablishment of the original condition of the operating element, for example, if the actual resistance value has approached the value determining the limit condition of the operating element.

The same is true if the relationship between the change of the resistance value of the tested operating element and the change-determining parameter is non-linear. Such a behavior is illustrated in the right part of FIG. 2. The relationship between the change of the resistance value and the parameter taken into consideration, for example, again the driven distance, is in this case, for example, approximately exponential. This is true, for example, in the consideration of the pressure difference as measure for the operating ability and efficiency of an air filter. The coordination between the resistance values determining the switching of the light diodes L1 to L4 and the driven distance takes place in this case also corresponding to the indicated curve shape. The measured resistance value thereby changes over-proportionally to the driven distance.

It is now possible with the aid of the circuit arrangement of FIG. 1 to interrogate the condition of the tested operating elements and to represent this condition with the aid of the light diodes L1 to L4 and 9–11 and to obtain possibly additional information about these operating elements with the aid of the reproduction or display devices 12 to 14. For that purpose, the measurement position switch 5 and the storage device 8 are cyclically operated, controlled by the driver 6. The measurement position switch 5 cyclically interrogates or questions the resistances 1 to 3 belonging to the operating elemens and connects these resistances successively with the comparator 7. The resistance values corresponding to the change-influencing interval limit values, which belong to the light diodes L1 to L4, are applied to the comparator 7 from the storage device 8, controlled synchronously by the driver 6. The flip-flops F1 to F4 are set, depending on which of the stored limit values is exceeded by the actual resistance value.

If the maximum change of the resistance value for the tested operating value, related to the change-influencing parameter, lies for example at 60% of the maximum change, then the flip-flops F1 and F2 are set. The light diodes L1 and L2 are thereby extinguished or turned off whereas the light diodes L3 and L4 continue to light up. If one of the interrogated resistance values has exceeded the limit value determinative for the light diode L3, i.e., if its change, for example, in case of a linear relationship with the change-determining parameter, is greater than 75%, then also the flip-flop F3 is set and the light diode L3 is extinguished or turned-off. If finally one of the operating elements has reached its maximum change, i.e., its resistance value has changed beyond the stored value $R_e$, then also the flip-flop F4 is set and the light diode L4 is turned-off and the light diode 9 is turned on.

It is thus possible with the aid of only the four light diodes L1 to L4 to monitor and test a large number of operating elements. The switching condition of the light diodes, i.e., whether turned on or off, is thereby determined by the operating element which has changed the most compared to the starting position, taking into consideration the relationship, illustrated for example in FIG. 2, between the change of the associated resistance value and the change-influencing parameter. If the light diode 9 is turned on with simultaneous turning off of the light diodes L1 to L4, then this indicates that at least one of the operating elements has changed maximally. With the use of the testing installation of the present invention in the manner of the service interval indicating installation, as described in the German Offenlegungsschrift No. 31 04 197, the driver is thus alerted by the indication to cause an examination of the operating elements to be undertaken. The corresponding state of condition will result with the use of the testing installation of the present invention as workshop diagnostic installation. It is indicated therewith that at least one of the operating elements requires a closer examination.

Which of the operating elements is thereby involved and what is the condition of the other operating elements will be obtained with the aid of the alpha-numerical reproduction or display devices 12 to 14. At first the connection between the driver 6 and the designation generator 17 has to be established with the aid of the switch 15. The designation generator 17 is thereby also synchronously controlled in a cyclic manner by the driver 6 and reads out successively the designation of the operating elements which are respectively interrogated with the aid of the measurement position switch 5. These designations are transmitted to the indicating devices 12 to 14 insofar as the comparator 7 determines that certain interval limit values have been exceeded.

The operating element which has reached its limit value, is represented or shown with its designation on the indicating device 12. The output of the comparator 7 which controls the flip-flop F4 and therewith the light diodes L4 and 9 is effective and operable for that purpose. Those operating elements are indicated on the indicating device 13, whose change has reached a value of more than 75% of the maximum change, taking into consideration their change behavior corresponding to FIG. 2. In order to avoid a double indication of the operating element lying above its limit condition, the outputs of the comparator 7 connected to the flip-flops F3 and F4 are connected to the indicating device 13 by way of an AND gate 25, whereby the one input is inverted.

Finally, the operating elements are represented or shown on the indicating device 14 whose change has a value between 50% and 75%, as related to the change-influencing parameter taken into consideration. The remaining operating elements which lie below 50% are not represented.

The operating elements are therewith tested and indicated as regards their properties and with a view to a possibly necessary exchange. This takes place in the manner of a worst-case representation, overall with the aid of the light diodes L1 to L4 and 11, and individually with the aid of the reproduction or display devices 12 to 14 insofar as their change lies above 50%.

Corresponding to the service-interval-indicating installation described in the German Offenlegungsschrift No. 31 04 197, more precise indications concerning the amount by which the maximum established change of an operating element has been exceeded can also be gained with the aid of the additional light diodes 10 and 11, connected by way of flip-flops F6 and F7. For that purpose, the light diodes 10 and 11 are turned on following the light diode 9, if the changes have reached predetermined limit values. These limit values are then also contained in the storage device 8 and are read-out together with the remaining limit values for each operating element controlled with the aid of the driver 6.

Finally, the need for an examination of the operating elements can be made particularly clear, as described also in the German Offenlegungsschrift No. 31 04 197. Assuming the measurement position switch 5 interrogates once, for example, at the beginning of a drive or at will in response to the desire of the vehicle user, the operating elements (resistances 1–3), then the light diodes L1–L4 that might possibly light up, can be turned-off again a short period of time thereafter. The flip-flops F1–F4 can be reset for that purpose by a conventional timing switch, for instance, in the form of a known timing circuit, or by an oil pressure control switch. In contrast thereto, the flip-flops F5–F7 are to be resettable only in a workshop. The light diodes 9–11 then remain always engaged or turned on—appropriately only during the operation of the vehicle. Since the circuits and elements indicated only schematically in the block diagram of FIG. 1 are of known construction, a detailed description thereof is dispensed with herein.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A test installation for motor vehicle operating elements which change compared to a starting condition and which, upon reaching an individual limit condition, trigger a common indicating means, comprising means forming an equal number of change intervals from the changes of the operating elements, said change intervals following one another and extending up to the respective limit condition, indicating means respectively coordinated to the change intervals of the operating elements, and control means for triggering the respective indicating means by that operating element which first reaches the limit of its change interval.

2. A test installation according to claim 1, wherein the indicating means are light devices.

3. A test installation according to claim 2, in which the light devices are turned off during triggering thereof.

4. A test installation according to claim 3, in which a warning indicating means is triggered simultaneously with the triggering of the indicating means for the last change interval limited by the limit condition.

5. A test installation according to claim 4, wherein further warning indicating means are turned on by the operating elements whose changes exceed predetermined excess interval limit values.

6. A test installation according to claim 5, wherein the reached change interval of the operating elements can be read-out individually by said control means.

7. A test installation according to claim 6, wherein said control means includes further means for reading out the designation of the operating elements located within the respective change intervals.

8. A test installation according to claim 7, wherein only the operating element can be read out with respect to at least one of their designation and the reached change interval whose change has reached a predetermined extent.

9. A test installation according to claim 8, wherein the extent is half the entire change.

10. A test installation according to claim 8, wherein said extent is about three-quarters of the overall change.

11. A test installation according to claim 8, wherein the change intervals of each operating element are identical among each other.

12. A test installation according to claim 11, wherein the change intervals include the entire change.

13. A test installation according to claim 11, wherein the change intervals are related to a change-influencing parameter.

14. A test installation according to claim 13, wherein the change-influencing parameters of the operating elements are selected substantially identical.

15. A test installation according to claim 14, wherein the change intervals are substantially synchronously traversed on the average for at least a part of the operating elements.

16. A test installation according to claim 15, wherein the changes of the operating elements prior to their coordination to the further indicating means are compared with predetermined change curves.

17. A test installation according to claim 1, wherein the change intervals of the operating elements are of equal value.

18. A test installation according to claim 1, in which a warning indicating means is triggered simultaneously with the triggering of the indicating means for the last change interval limited by the limit condition.

19. A test installation according to claim 18, wherein further warning indicating means are turned on by the operating elements whose changes exceed predetermined excess interval limit values.

20. A test installation according to claim 1, wherein the reached change interval of the operating elements can be read out individually by said control means.

21. A test installation according to claim 1, wherein said control means includes further means for reading out the designation of the operating elements located within the respective change intervals.

22. A test installation according to claim 21, wherein only the operating elements can be read out with respect to at least one of their designation and the reached change interval whose change has reached a predetermined extent.

23. A test installation according to claim 22, wherein the extent is half the entire change.

24. A test installation according to claim 23, wherein said extent is about three-quarters of the overall change.

25. A test installation according to claim 1, wherein the change intervals of each operating element are identical among each other.

26. A test installation according to claim 1, wherein the change intervals include the entire change.

27. A test installation according to claim 1, wherein the change intervals are related to a change-influencing parameter.

28. A test installation according to claim 27, wherein the change-influencing parameters of the operating elements are selected substantially identical.

29. A test installation according to claim 1, wherein the change intervals are substantially synchronously traversed on the average for at least a part of the operating elements.

30. A test installation according to claim 1, wherein the changes of the operating elements prior to their coordination to the further indicating means are compared with predetermined change curves.

* * * * *